Dec. 6, 1966  A. GINSBERG  3,289,897

COMBINED AGITATOR AND FLUID MOVER

Filed March 15, 1966

INVENTOR.
ARTHUR GINSBERG
BY Kimmel, Crowell & Weaver
ATTORNEYS.

User Sates Patent Office 3,289,897
Patented Dec. 6, 1966

3,289,897
COMBINED AGITATOR AND FLUID MOVER
Arthur Ginsberg, New York, N.Y., assignor to Royal London, Ltd., New York, N.Y., a corporation of New York
Filed Mar. 15, 1965, Ser. No. 534,384
10 Claims. (Cl. 222—239)

This invention relates to a combined agitator and fluid mover and more particularly to a mixer and pump which is particularly adapted for use in a coctail shaker for selectively agitating the constituents of a coctail and then dispensing the finished product, although it should be understood that the use of the instant invention is not so limited.

It is a primary object of the instant invention to provide a device for agitating a fluid system and then moving the liquid to a remote location.

Another object of the instant invention is to provide a combined agitator and liquid pump or screw such that rotation of the pump or screw in a first direction acts to agitate the liquid in which the pump is immersed while rotation in the other direction acts to move the liquid to a remote location.

Another object of the instant invention is to provide a reversible drive means operatively connected with the rotary pump or screw for selectively driving the pump or screw in either rotary direction at the command of a user.

Another object and advantage of the instant invention resides in the connection between the pump, pump housing and conduit from which the liquid is moved such that the pump housing will rotate with the rotary pump when the pump is moved in the first rotary direction in order to agitate the liquid in which the pump housing is immersed.

A still further object of the instant invention is the provision of a combined agitator and pump in which the pump housing includes a plurality of externally disposed fins to facilitate the agitation of the liquid.

Still another object of the instant invention is to provide a new and novel combined agitator and pump which is compact, inexpensive to manufacture, and which requires only a single conduit leading from the supporting structure to the pump and pump housing.

Further objects and advantages of the instant invention reside in the combinations of elements, arrangements of parts, and features of construction, all as will be pointed out more fully hereinafter and disclosed in the accompanying drawing wherein there is shown a preferred embodiment of this inventive concept.

In the drawing:

FIGURE 1 is a side elevational view of a coctail shaker which the combined agitator and pump of the instant invention is utilized;

FIGURE 2 is a top plan view of the coctail shaker of FIGURE 1;

FIGURE 3 is a partial rear view of the coctail shaker of FIGURES 1 and 2 illustrating the release mechanism for removing the cover of the coctail shaker;

FIGURE 4 is an enlarged vertical cross-sectional view of the supporting structure, pump and pump housing of the instant invention illustrating the cooperative relationships between the components of the instant invention;

FIGURE 5 is an enlarged partial side elevational view of the lower end of the conduit illustrating the one way clutch acting to allow the pump housing to rotate in a first direction with the pumping mechanism interiorly thereof and precluding rotation of the pump housing in the other direction;

FIGURE 6 is a bottom view of the pump and pump housing of the device of the instant invention as may be seen along line 6—6 of FIGURE 4 as viewed in the direction indicated by the arrows;

FIGURE 7 is a transverse cross-sectional view of the conduit and pump housing taken substantially along line 7—7 of FIGURE 4 as viewed in the direction indicated by the arrows; and FIGURE 8 is a schematic view of the driving means and electrical circuit for selectively rotating the pump in either rotary direction.

Referring now to the drawing in detail, wherein like reference characters designate like elements throughout the several views thereof, there is shown generally at 10 a coctail shaker including a receptacle 12, a supporting mechanism structure shown generally at 14. Supported by structure 14 is a combined liquid lifting mechanism and agitator shown generally at 16 cooperatively connected with a driving mechanism shown generally at 18 located within supporting structure 14. As will be explained more fully hereinafter, the components of the coctail desired to be mixed will be placed in receptacle 12 with structure 14 being positioned thereover with liquid lifting and agitating mechanism 16 being positioned below the liquid level therein. Driving mechanism 18 is actuated such that a pump or screw shown generally at 20 is rotated in a first direction to rotate concurrently the housing shown generally at 22 for agitating the constituents in receptacle 12. After the agitation cycle is complete, driving mechanism 18 is manipulated to rotate pump 20 in the opposite direction such that housing 22 is stationary to allow pump 20 to lift the fluid through a conduit 24 and a dispensing outlet 26.

As may be seen in FIGURE 1, receptacle 12 is preferably a frusto-conical glass container, although it may be of any suitable size and configuration, having an open top 28 and a flat bottom 30 positioned on a suitable working surface 32. Framework 14 includes a platform 34 forming a depending annular flange 36 extending around the upper end of receptacle 12 with an annular gasket 38 being positioned against flange 36 for suitably engaging the upper edge of receptacle 12 to prevent the loss of liquid at the junction of receptacle 12 and supporting structure 14.

Structure 14 includes an ornamentally designed cover shown generally at 40 having a closed wall 42 constituting a substantial extension of depending flange 36 and a diagonal top 44 for enclosing driving mechanism 18 and other components of the instant invention. Cover 40 is releasably attached to platform 34 by a pair of releasable connectors shown generally at 46, 48 positioned in a pair of apertures 50, 52 formed in wall 42.

As may be seen best in FIGURE 4, releasable connector 46 includes a plate 54 mounted on a resilient arm 56 which is connected to platform 34 by a rivet 58 such that depressing plate 54 will free it from the confines of aperture 50 to release the engagement between the rear of cover 40 and platform 34. As also shown in FIGURE 4, releasable connector 48 includes a plate 60 movably positioned in aperture 50 by a spring-biased hinge 62 for biasing plate 60 outwardly. A lip 64 on the upper end of plate 60 precludes outward shifting thereof when cover 40 is in place. It will be apparent that the simultaneous depression of plates 54, 60 will allow cover 40 to be removed to gain access to driving means 18. Conversely, the depression of plates 54, 60 will allow cover 40 to be inserted thereover to securely engage cover 40 with platform 34.

Liquid lifting and agitating mechanism 16 includes a holder shown generally at 66 having a horizontal annular flange 68 secured to the bottom of platform 34 and sandwiched between platform 34 and annular gasket 38. Holder 66 forms a frusto-conical shaped liquid accumulating cavity 70, the upper end of which is closed by a pair of spaced apart walls 72, 74 with a flexible tube 76 providing communication between cavity 70 and the interior of cover 40. A flexible adaptor 78 is positioned about the ends of flexible tube 76 and dispensing outlet 26 which is illustrated as a substantially rigid member extending through closure plate 60 of releasable connector 48. As will be explained more fully hereinafter, the liquid within receptacle 12 will be driven upwardly through conduit 24 into cavity 70 from which it will exit through flexible tube 76 and adaptor 78 into dispensing outlet 26. Because of the flexible nature of tube 26 and adaptor 78, it will be apparent that plate 60 can be readily manipulated to remove cover 40.

The lower end of holder 66 forms a cylindrical wall 80 receiving conduit 24, which is illustrated as tubular and which may be of any configuration, the upper end of which forms an outwardly extending flange 82 engaging the bottom of cylindrical wall 80. A cap 84 is snapped on cylindrical wall 80 and provides a shoulder underlying flange 82, thereby securing conduit 24 in fluid communication with cavity 70.

Referring now to the distal end of conduit 24, housing 22 is mounted for unidirectional rotation on the lower end of conduit 24 such that the rotation of pump 20 in one direction also rotates housing 22 to agitate the liquid in receptacle 12 while rotation of pump 20 in the opposite direction retains housing 22 stationary such that the liquid therein may be forced through conduit 24, cavity 70, tube 76, adaptor 78 and discharge outlet 26. Supporting housing 22 for rotation is a stug conduit 86 forming an annular outwardly extending shoulder 88 at the lower end thereof with stub conduit 86 being secured, as by glue or the like, in the interior of conduit 24. Housing 22 includes a hub 90 rotatably mounted about stub conduit 86 between shoulder 88 and the lowermost end of conduit 24 with a cavity 92 forming a shoulder 94 resting on the upper surface of annular shoulder 88 to support housing 22.

Providing for the unidirectional mounting of housing 22 is a one way clutch shown generally at 96 including a spring wire 98 coiled about conduit 24 and having the upper end 100 thereof fastened in an aperture extending part way through conduit 24. The lower end 102 of spring 98 is reverted to be positioned in a notch 104 formed in the upper edge of hub 90. As may be seen best in FIGURE 5, notch 104 has a vertical face and an inclined face such that housing 22 will be rotated from right to left as indicated by the arrows, while reverse rotation is precluded by coaction between the lower end 102 of spring 98 and the vertical face of notch 104.

Housing 22 also includes a pump compartment 106 in which is mounted a plurality of blades 108 acting to draw liquid through an inlet opening 110 and discharge it through a plurality of outlet openings 112 formed on a wall 114 separating cavity 92 from pump compartment 106. Blades 108 extend outwardly from the lower end of a shaft 116 which is mounted for rotation in a journal 118 centrally located in wall 114. It will be apparent the rotation of shaft 116 by driving means 18 will result in the rotation of blades 108.

Another one way clutch shown generally at 120 acts to drivingly couple shaft 116 to housing 22 when shaft 116 is rotated in the direction indicated by the arrow in FIGURE 5. One way clutch 120 includes a coiled spring wire 122 having the upper end secured to shaft 116 with the lower end thereof engaging one of a plurality of stops 124. Stops 124 include a vertical face and an inclined face, substantially the reverse of notch 104 such that the lower end of spring wire 122 contacts the vertical face when shaft 116 is rotated in the direction indicated by the arrow in FIGURE 5.

It will accordingly be seen that the rotation of shaft 116 in this direction will act to operatively engage the shaft 116 with housing 22 such that housing 22 may rotate in the direction shown to agitate the liquid within housing 12. To facilitate the agitating action, a plurality of outwardly extending fins 126 are provided on the exterior surface of housing 22. It will also be seen that reverse rotation of shaft 116 will act to rotate blades 108 with one way clutch 120 acting to slip by stops 104 to disengage shaft 116 from housing 22. In addition, one way clutch 96 will positively hold housing 22 in a stationary position such that the liquid may be drawn through inlet opening 110 and discharge through outlet openings 112 into cavity 92 and consequently conduit 24.

Referring again to FIGURE 4, it will be seen that the upper end of shaft 116 extends through closure walls 72, 74 with a seal 128 being provided to prevent the liquid from escaping. The upper extremity of shaft 116 is secured by a coupling 130 to the drive shaft 132 of an electric motor 134 secured to platform 34 by conventional fasteners 136. Positioned above electric motor 134 on an inverted U-shaped bracket 136 is a pair of batteries 138 controlled by a conventional switch shown generally at 140 having an operating button 142 extending through an opening 144 and top 44 of cover 40. For purposes of economic manufacture, U-shaped bracket 136 is provided with a pair of spaced apart openings 146, 148 such that flexible adaptor 78 and a pair of lead wires 150, 152 may pass therethrough.

Referring now to FIGURE 4 in conjunction with FIGURE 8, it will be seen that lead wires 150, 152 connect with a pair of electrical contacts 154, 156 of switch 140 which is illustrated as of the double pole, double throw variety. Electrical contact 154 is placed in electrical communication with another contact 158 adjacent contact 156 by an electrical wire 160. Similarly, electrical contact 156 is placed in communication with still another contact 162 adjacent contact 154 by an electrical wire 164. Operating button 142 is in electrical communication with a pair of terminals 166, 168, each of which is connected to an opposite side of batteries 138 by a suitable conduit 170, 172.

When operating button 142 is placed in communication with contacts 154, 156, it will be seen that an electrical circuit is completed including batteries 138, switch 140 and electric motor 134, which is illustrated as of the direct current variety for purposes of convenience. The closing of switch 140 to include contacts 154, 162 will result in driving electric motor 134 in the first direction thereby acting to rotate shaft 116 and housing 22 in a similar direction to agitate the liquids in receptacle 12. When operating button 142 is reversed, such that it is in engagement with contacts 156, 158, it will be readily apparent that electric motor 134 will be driven in the opposite direction to pump the fluids from receptacle 12.

Although the instant invention has been described as illustrating a centrifugal pump with an axial inlet and a plurality of parallel outlets, it should be understood that pump 20 may be an Archemedes screw or with a pump of any other configuration. It should be understood, however, that the illustrated embodiment is preferred and that the rotary pump illustrated has numerous advantages over other types of fluid movers.

It is now seen that there is herein provided an improved agitator and fluid mover which accomplishes all of the objects and advantages of the instant invention and others, including many advantages of great practical utility and commercial importance.

Since many embodiments may be made of the instant inventive concept, and since many modifications may be made of the embodiment shown and described, it is to be understood that the foregoing is to be interpreted merely as illustrative and not in a limited sense.

I claim:
1. A combined agitator and fluid lifting device comprising a frame adapted to be positioned adjacent a fluid containing receptacle;

a conduit extending away from the frame for immersion in the fluid;

a housing, rotatably mounted on the conduit adjacent the terminus thereof, having an inlet opening in communication with the conduit;

a liquid lifting mechanism rotatably mounted in the housing for moving a liquid through the inlet opening and into the conduit;

means for selectively rotating the liquid lifting mechanism independently of the housing to propel liquid into the conduit; and means for selectively rotating the housing to agitate the liquid in the receptacle.

2. The agitator and fluid moving device of claim 1 wherein the liquid mechanism rotating means includes a shaft extending through the conduit;

means, on the frame, for selectively rotating the shaft in a second direction; and means, connecting the conduit and the housing, for holding the housing substantially stationary when the shaft is rotating in the second direction.

3. The agitator and fluid moving device of claim 2 wherein the housing rotating means includes the shaft;

the shaft rotating means;

means for selectively reversing the direction of rotation of the shaft to a first direction;

means for driveably connecting the shaft and the housing when the housing rotates in the first direction; and the holding means includes a one-way drive connection releasing the housing for rotation in the first direction to agitate the fluid in the receptacle upon rotation of the shaft in the first direction.

4. The agitator and fluid moving device of claim 3 further including fins on the exterior surface of the housing for facilitating the agitating action of the housing when it is rotated in the first direction.

5. A combined fluid agitator and fluid mover comprising a support adapted to be positioned adjacent a fluid containing receptacle;

a fluid discharge means carried by the support;

a conduit extending away from the support for immersion in the fluid in communication with the fluid discharge means;

a hollow fluid agitating element having an opening therein mounted for uni-directional rotation adjacent the distal end of the conduit;

a fluid moving mechanism mounted for bi-directional rotation in the hollow agitator element;

a drive shaft connected to the fluid moving mechanism extending through the conduit;

a reversible drive means on the support connected to the upper end of the shaft, and one-way clutch means connecting the fluid mover to the agitator to rotate the agitator with the fluid mover upon rotation of the impeller in one direction to agitate the fluid in the receptacle, and releasable upon rotation o fthe fluid mover in the other direction to permit rotation of the fluid mover to rotate in the hollow agitating element to draw fluid through the opening therein and force the fluid upwardly through the conduit outwardly through the fluid discharge means.

6. The combined fluid agitator and fluid mover of claim 5 further including a one-way clutch connecting the hollow element and the conduit for holding the hollow element fixed with the conduit when the impeller rotates in the other direction for drawing fluid through the hollow element, conduit and discharge means and for releasing the hollow element for movement with the fluid mover to agitate the fluid in the receptacle.

7. The combined fluid agitator and fluid mover to claim 6 wherein the one-way clutch means includes a first spring wire coiled about the drive shaft having one end thereof secured to the drive shaft; and at least one stop in the hollow element for engaging and coupling the other end of the first spring wire to the hollow element when the shaft rotates in the one direction and for disengaging the other end of the first spring wire when the shaft rotates in the opposite direction.

8. The combined fluid agitator and fluid mover of claim 7 wherein the one-way clutch includes a second spring wire coiled about the conduit having one end thereof secured to the conduit; and means on the exterior of the hollow element for engaging and coupling the other end of the second spring wire to the hollow element when the shaft rotates in the opposite direction and for disengaging the other end of the second spring wire when the shaft rotates in the one direction for rotating the shaft, fluid mover and hollow element together to agitate the contents of the receptacle.

9. The combined fluid agitator and fluid mover of claim 8 wherein the reversible drive means includes a reversible direct current motor, at least one battery, a polarity reversing switch and a circuit connecting the motor, battery and switch.

10. The combined fluid agitator and fluid mover of claim 9 wherein the fluid moving mechanism includes a plurality of blades extending outwardly from adjacent the lower end of the drive shaft.

References Cited by the Examiner

UNITED STATES PATENTS

| | | | |
|---|---|---|---|
| 1,147,554 | 7/1915 | Santicola | 259—39 |
| 1,428,438 | 9/1922 | Kelly | 259—105 |
| 1,564,799 | 12/1925 | Thornton | 103—83 |
| 2,209,287 | 7/1940 | Simpson | 259—105 |
| 2,555,686 | 6/1951 | Farrelly et al. | 261—36 |
| 2,740,558 | 4/1956 | Steele | 222—385 X |
| 2,745,641 | 5/1956 | Jacobs | 259—36 |
| 2,801,083 | 7/1957 | Balassa | 259—8 |
| 3,211,338 | 10/1965 | Weil et al. | 222—385 X |
| 3,220,954 | 11/1965 | Malbe | 252—359 |

RAPHAEL M. LUPO, *Primary Examiner.*